Aug. 7, 1951   R. M. FORD ET AL   2,563,403
ROLLER ADJUSTING MEANS FOR ROTARY
DUPLICATING MACHINES
Filed May 25, 1949   2 Sheets-Sheet 1

INVENTORS
Ronald Max Ford
Denis Percy Crane
Richardson, David and Nordon
ATTY'S

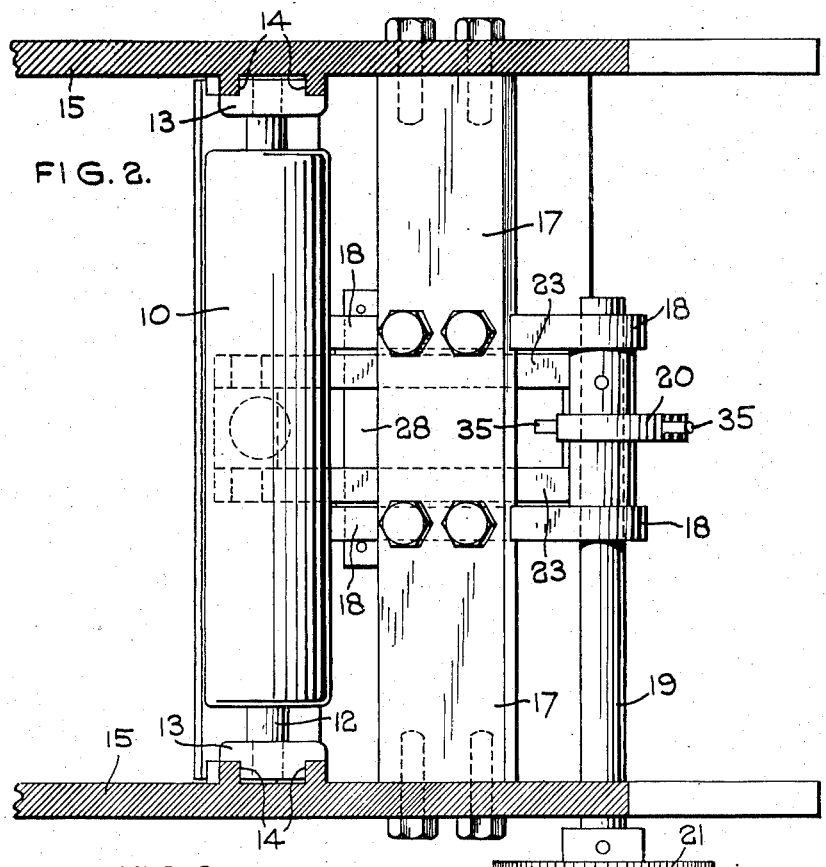
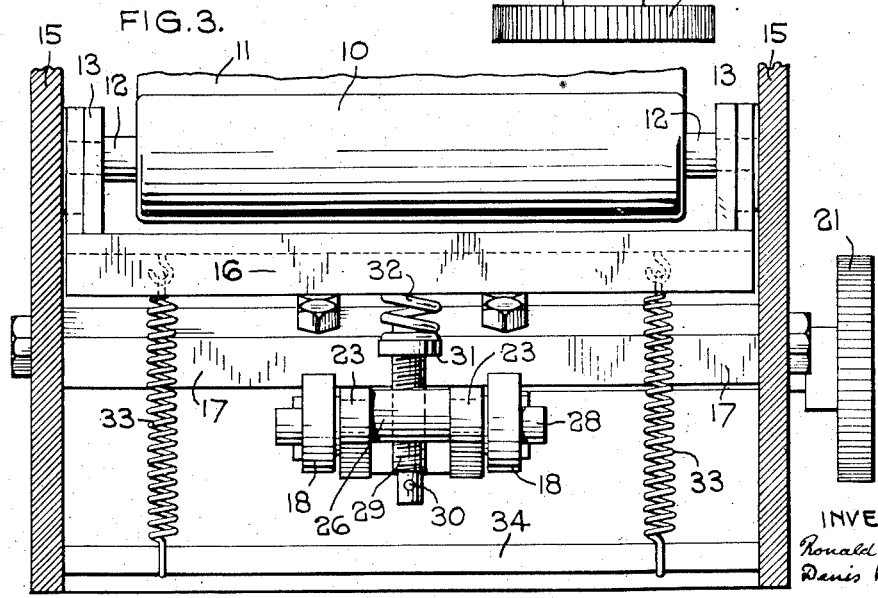

UNITED STATES PATENT OFFICE 2,563,403

ROLLER ADJUSTING MEANS FOR ROTARY DUPLICATING MACHINES

Ronald Max Ford and Denis Percy Crane, Sparkbrook, Birmingham, England; said Crane assignor to Frank R. Ford Limited, Birmingham, England, a British company Application May 25, 1949, Serial No. 95,203
In Great Britain May 31, 1948

4 Claims. (Cl. 101—232)

This invention relates to duplicating machines of the kind in which a copy sheet and a master sheet bearing in reverse script the matter to be reproduced are passed in pressure contact between a cylinder to which the master sheet is clamped and a pressure roller, the copy sheet being moistened before being brought into contact with the master sheet.

The object of the present invention is to provide improved means for supporting the ends of the pressure roller and applying pressure thereto to ensure that uniform pressure is obtained throughout its length.

According to the present invention the pressure roller spindle or its equivalent is supported at opposite ends of the roller in bearings which are movable in the machine frame towards and away from the axis of the cylinder, and the bearings are carried by the ends of a beam which is arranged parallel to the axis of the pressure roller, means being provided for applying pressure to the beam at a position midway between the bearing engaging parts thereof.

The means for applying pressure to the beam are such that the intensity of the pressure can be varied.

The pressure may be applied to the beam through a flexible and resilient member, such as a coiled spring.

Referring to the attached drawings:

Figure 2 is a plan view of the pressure roller assembly; and

Figure 3 is an end view of the pressure roller assembly.

Figure 1:
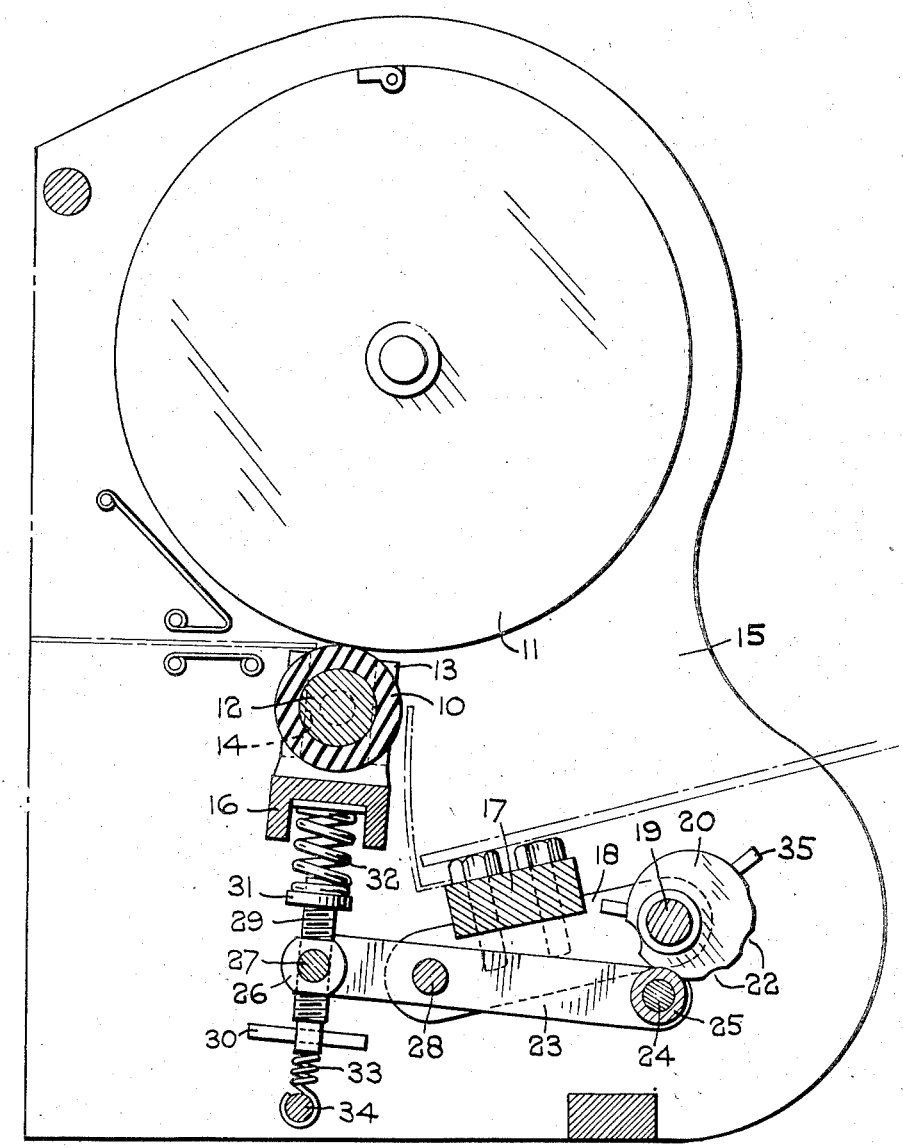
Figure 1 is a section through a duplicating machine showing in detail the pressure roller assembly.

In the construction shown in the accompanying drawings, the pressure roller 10 is arranged parallel to and under the master sheet cylinder 11, and the pressure roller 10 is mounted on a spindle 12 the ends of which are supported in bearings 13, which can slide in guides 14 provided on the inner sides of the side plates 15 of the frame, these guides 14 being arranged radially in relation to the axis of the cylinder 11, as seen in Figure 1.

The bearings 13 are carried by the ends of a beam 16 which is of inverted channel section, and this beam 16 forms a floating beam.

A bearing 17 is provided connected to the two side plates 15 of the frame of the machine, and mounted on this bearing 17 are two spaced brackets 18 in which is mounted the spindle 19 of a cam 20 which is disposed between the two brackets 18. The spindle 19 is provided with an operating member 21 so that the cam 20 can be turned by hand. The periphery of the cam 20 is eccentric in relation to the cam spindle 19, and its periphery is provided with a series of spaced notches 22. Stop pins 35 fixed to the cam limit the angular rotation thereof.

Pivoted to the opposite ends of the two brackets 18 are two levers 23, and at one end these levers 23 are connected by a spindle 24 carrying a roller 25 which can be engaged by the cam 20. At the opposite end the two levers 23 are connected by a block 26 which is pivotally mounted in the levers 23 on an axis 27 parallel to the pivotal axis 28 of the levers 23, and extending through this block 26 is a screw 29 which can be operated by hand. The screw 29 is provided with a head 30 below the levers 23, whereby it may be turned by hand, and above the levers 23 it is provided with a head 31 to which the lower end of a coiled compression spring 32 is fixed. The upper end of the compression spring 32 is secured to the underside of the beam 16 midway between the ends of the beam.

Two springs 33 are provided each attached at one end to the beam 16 and at the other end to a rod 34 extending between the side plates 15.

Maximum pressure can be set by turning the cam 20 into a suitable position and then adjusting the screw 29 to provide the required pressure. As the cam 20 is turned the pressure is reduced in a series of steps.

The arrangement provides a floating beam by which is ensured uniform pressure along the length of the pressure roller 10.

What we claim then is:

1. In a duplicating machine of the kind specified having a master sheet cylinder and a pressure roller cooperating therewith; means for supporting the ends of the pressure roller and for applying pressure thereto comprising, an elongated beam arranged parallel to the axis of the pressure roller; bearings for the ends of the pressure roller carried by said beam, said bearings being guided in the frame of the machine for rectilinear movement towards and away from the axis of the master sheet cylinder; a bearing member fixed between side plates in the frame of the machine; a pair of spaced brackets mounted thereon; a lever pivoted on each bracket on an axis parallel to the axis of the pressure roller; a block disposed below said beam, extending between one pair of ends of said levers and pivotally mounted in said levers on an axis parallel to the pivotal axis of the levers; a screw extending upwardly through a screwthreaded hole in said block; a coiled spring fixed to the upper end of said screw and engaging the underside of said elongated beam midway between the ends thereof to exert pressure thereon; means for rotating said screw to apply the required pressure to the beam; and means for causing pivotal movement of the levers to increase or decrease the pressure applied to the pressure roller in a series of predetermined steps.

2. In a duplicating machine of the kind specified having a master sheet cylinder and a pressure roller cooperating therewith; means for supporting the ends of the pressure roller and for applying pressure thereto comprising, an elongated beam arranged parallel to the axis of the pressure roller; bearings for the ends of the pressure roller carried by said beam, said bearings being guided in the frame of the machine for rectilinear movement towards and away from the axis of the master sheet cylinder; a bearing member fixed between side plates in the frame of the machine; a pair of spaced brackets mounted thereon; a lever pivoted on each bracket on an axis parallel to the axis of the pressure roller; a block disposed below said beam, extending between one pair of ends of said levers and pivotally mounted in said levers on an axis parallel to the pivotal axis of the levers; a screw extending upwardly through a screwthreaded hole in said block; a coiled spring fixed to the upper end of said screw and engaging the underside of said elongated beam midway between the ends thereof to exert pressure thereon; means for rotating said screw to apply the required pressure to the beam; a roller mounted between the other pair of ends of said levers; a spindle mounted between said spaced brackets; a cam on said spindle in operative engagement with said roller; and means for rotating said spindle and cam thereon to cause pivotal movement of the lever to increase or decrease the pressure applied to the beam.

3. In a duplicating machine of the kind specified having a master sheet cylinder and a pressure roller cooperating therewith; means for supporting the ends of the pressure roller and for applying pressure thereto comprising, an elongated beam arranged parallel to the axis of the pressure roller; bearings for the ends of the pressure roller carried by said beam, said bearings being guided in the frame of the machine for rectilinear movement towards and away from the axis of the master sheet cylinder; a bearing member fixed between side plates in the frame of the machine; a pair of spaced brackets mounted thereon; a lever pivoted on each bracket on an axis parallel to the axis of the pressure roller; a block, disposed below said beam, extending between one pair of ends of said levers and pivotally mounted in said levers on an axis parallel to the pivotal axis of the levers; a screw extending upwardly through a screwthreaded hole in said block; a coiled spring fixed to the upper end of said screw and engaging the underside of said elongated beam midway between the ends thereof to exert pressure thereon, means for rotating said screw to apply the required pressure to the beam; spring means acting on the beam tending to move it away from the axis of the master cylinder and means for causing pivotal movement of the levers to increase or decrease the pressure applied to the pressure roller in a series of predetermined steps.

4. In a duplicating machine of the kind specified having a master sheet cylinder and a pressure roller cooperating therewith; means for supporting the ends of the pressure roller and for applying pressure thereto comprising, an elongated beam arranged parallel to the axis of the pressure roller; bearings for the ends of the pressure roller carried by said beam, said bearings being guided in the frame of the machine for rectilinear movement towards and away from the axis of the master sheet cylinder; a bearing member fixed between side plates in the frame of the machine; a pair of spaced brackets mounted thereon; a lever pivoted on each bracket on an axis parallel to the axis of the pressure roller; a block, disposed below said beam, extending between one pair of ends of said levers and pivotally mounted in said levers on an axis parallel to the pivotal axis of the levers; a screw extending upwardly through a screwthreaded hole in said block; a coiled spring fixed to the upper end of said screw and engaging the underside of said elongated beam midway between the ends thereof to exert pressure thereon, means for rotating said screw to apply the required pressure to the beam; a pair of springs acting between said beam and a fixed part of the frame of the machine, said springs being disposed at equal distances from the centre of the beam and tending to move the beam away from the master cylinder; a roller mounted between the other pair of ends of said levers; a spindle mounted between said spaced brackets; a cam on said spindle in operative engagement with said roller; and means for rotating said spindle and cam thereon to cause pivotal movement of the lever to increase or decrease the pressure applied to the beam.

RONALD MAX FORD.
DENIS PERCY CRANE.

REFERENCES CITED

The following references are of record in the file of this patent:

UNITED STATES PATENTS

| Number | Name | Date |
|---|---|---|
| 2,072,534 | Terry | Mar. 2, 1937 |
| 2,165,972 | Kokay | July 11, 1939 |
| 2,168,511 | Berger | Aug. 8, 1939 |
| 2,299,974 | Grobecker | Oct. 27, 1942 |
| 2,466,873 | Avery | Apr. 12, 1949 |